Figure 1:
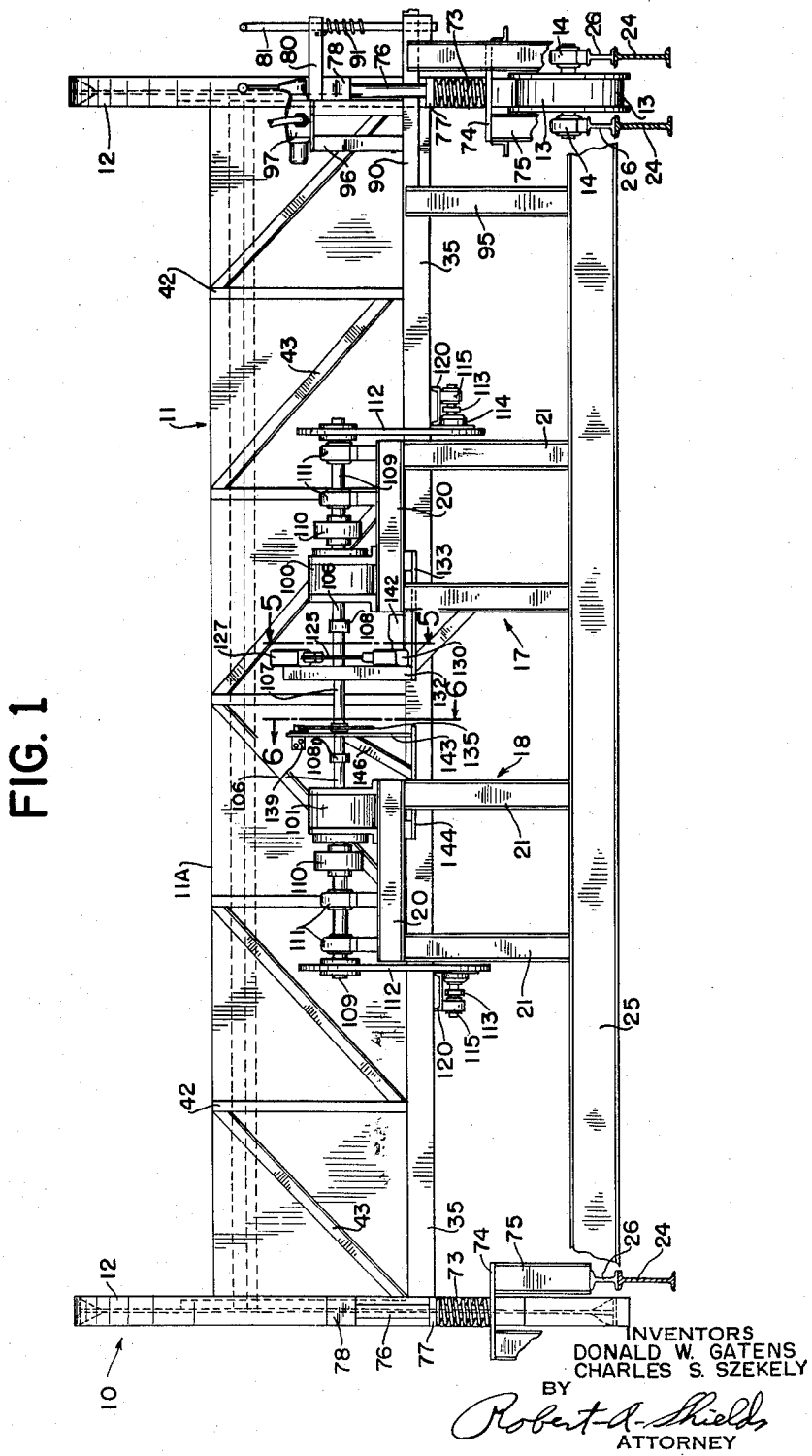

Feb. 5, 1963 D. W. GATENS ET AL 3,076,568
ROTARY DUMP
Filed April 29, 1960 5 Sheets-Sheet 1

INVENTORS
DONALD W. GATENS
CHARLES S. SZEKELY
BY
Robert A. Shields
ATTORNEY

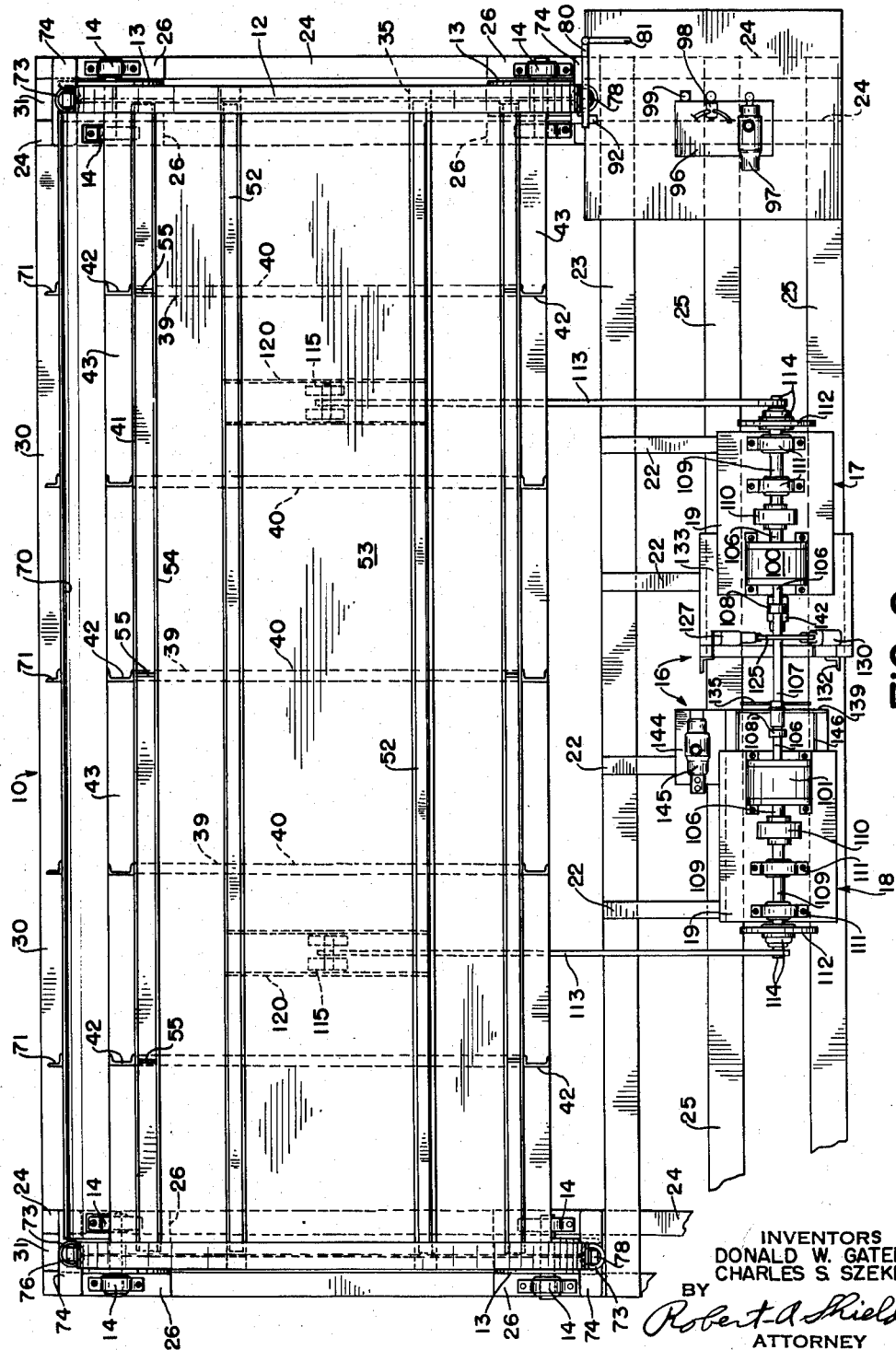

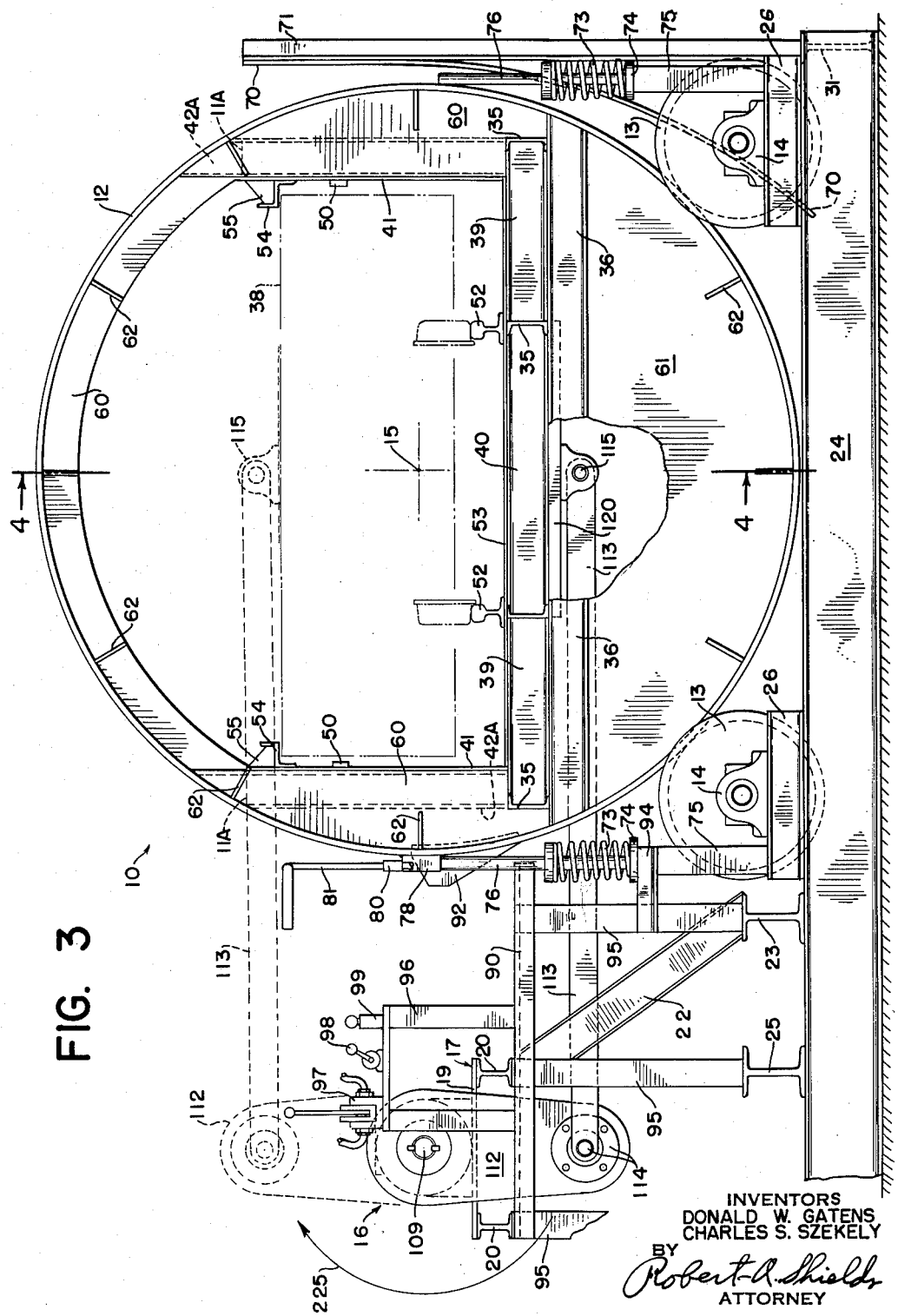

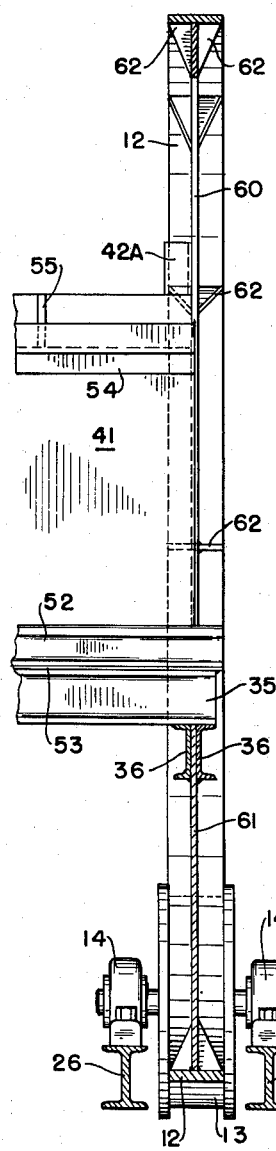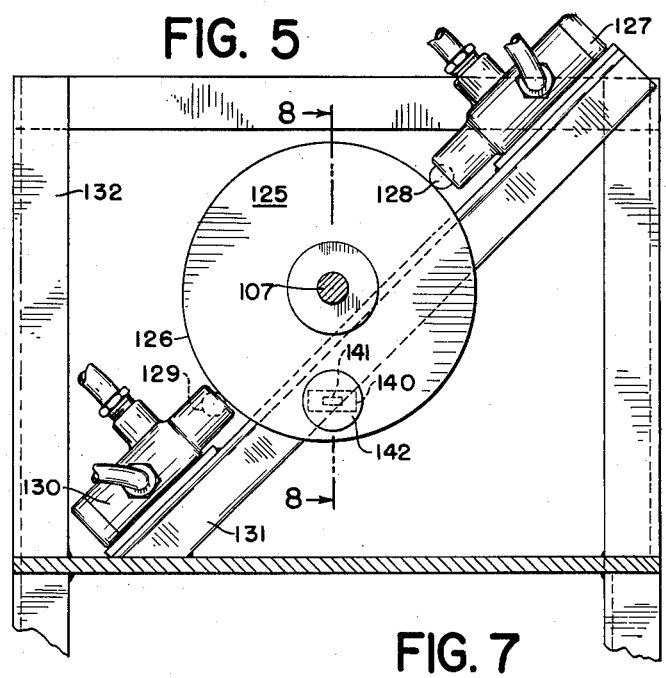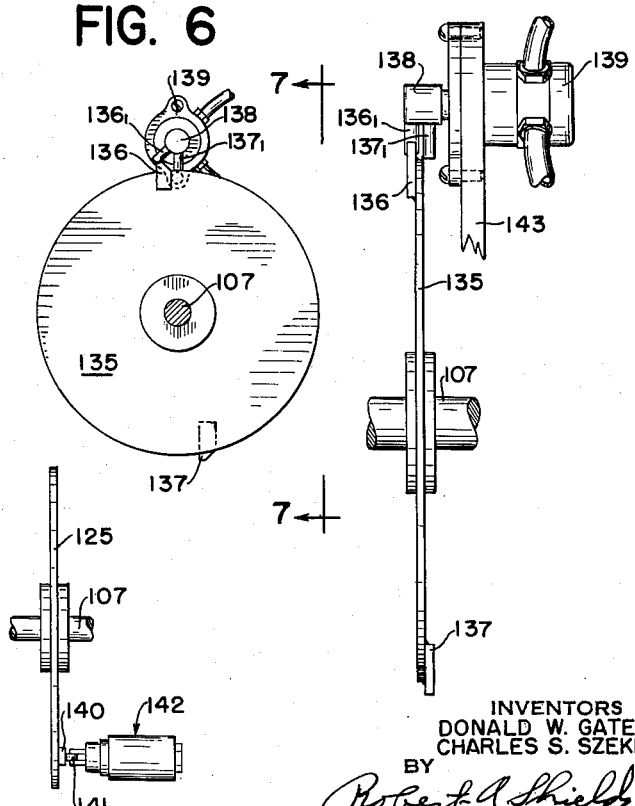

Feb. 5, 1963 D. W. GATENS ET AL 3,076,568
ROTARY DUMP
Filed April 29, 1960 5 Sheets-Sheet 5

INVENTORS
DONALD W. GATENS
CHARLES S. SZEKELY
BY
Robert A. Shields
ATTORNEY

United States Patent Office 3,076,568
Patented Feb. 5, 1963

3,076,568
ROTARY DUMP
Donald W. Gatens and Charles S. Szekely, both of Huntington, W. Va., assignors to ACF Industries, Incorporated, New York, N.Y., a corporation of New Jersey
Filed Apr. 29, 1960, Ser. No. 25,754
8 Claims. (Cl. 214—52)

This invention relates to a rotary dump and inverting a loaded railway car to empty the contents thereof and for returning the car to its upright position, and wherein the entire operation is positively controlled.

The objects of the invention include the provision in such a rotary dump of a fluid power plant in which the means for controlling the start, deceleration, stop and return of the rotary movements of the dump are self-contained, having no immediate connection to the dumping structure other than the rotary driving means connecting the power plant and the structure.

It is a further object of the invention to provide a fluid circuit peculiarly adapted for use in the fluid power plant for positively controlling the start of the rotation operation of the rotary structure and for continuing this positive control throughout the full dumping and return cycle of the rotary dump of the invention. The invention contemplates this control as a continuous exerting force, both in the initial rotary lifting required to start the dump and when the rotary structure is rotating with the loaded car in an off centered condition. In the same manner the return of the rotary is controlled by a continuous exerting force. At no time during the rotational movements of the rotary, through 180 degree dump and then through 180 degree return, is there a change in the direction of pressure from the fluid power plant, except, of course, in the reversing of rotary direction at the initial uplift of the inverted car.

The manner in which the power means and the rotary cooperate to effect the required dumping operations results in a controlled rotary dump structure and power plant which is very easily operated with a minimum amount of operator know-how or interference.

The invention further contemplates the use of a rotary oscillating torque actuator for shaft driving a torque arm under fluid pressure through a cycle of 180 degree dump and 180 degree return. While the torque arm connects the rotary structure of the dump, the driving shaft of the actuator means is utilized to mount signal apparatus such as cam surfaces to actuate the components of the fluid circuit. As the movement of the rotary structure and the drive shaft are both circular and may be synchronized, the signal means on the drive shaft may be placed to correspond with the changing positions of the dumping apparatus and trigger start, stop, deceleration, and a reverse control components in the fluid circuit.

Figure 9:
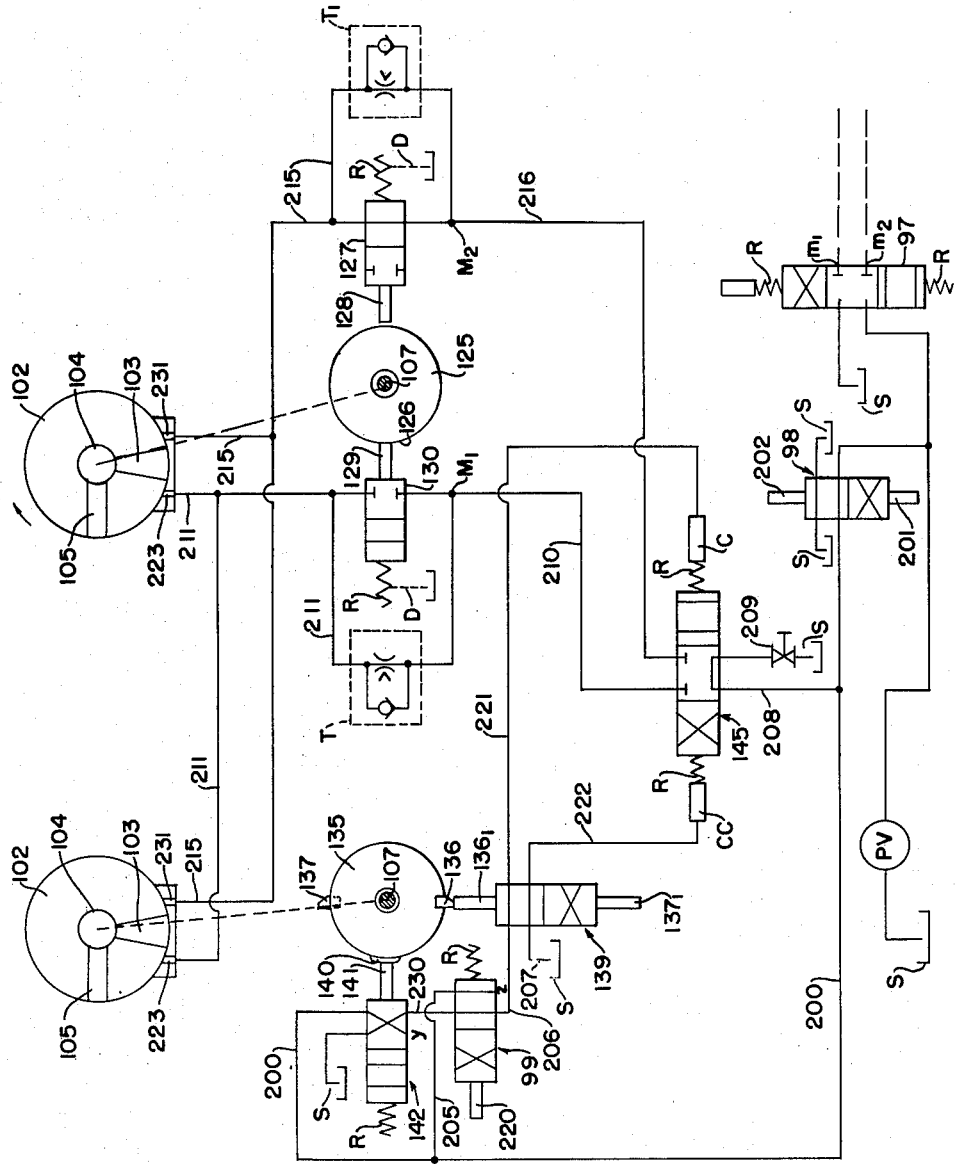

The invention will be understood after a reading of the following detailed description with reference to the accompanying drawings, of which:

FIGURE 1 is a side elevation of a rotary dump embodying the present invention;
FIGURE 2 is a plan view of the rotary dump of FIG. 1;
FIGURE 3 is a front end view of the rotary dump of FIG. 1;
FIGURE 4 is a section taken along the line 4—4 of FIG. 3;
FIGURE 5 is a section taken substantially along the line 5—5 of FIG. 1;
FIGURE 6 is a section taken substantially along line 6—6 of FIG. 1;
FIGURE 7 is a view taken along the line 7—7 of FIG. 6;
FIGURE 8 is a view taken substantially along the line 8—8 of FIG. 5; and,
FIGURE 9 is a circuit diagram of a hydraulic system utilized in the fluid power plant of the rotary dump of the prior figures.

Referring to the figures, the rotary dump 10 comprises a rotary structure including a longitudinally extending railway car retainer body 11 supported at its ends by rings 12. The rings are supported at their outer surface of revolution on either side of the vertical center line thereof by wheel bearings 13. The wheel bearings provide flanges fore and aft of the rings for longitudinal stability of the rotary structure. Each wheel bearing is shaft mounted forwardly and rearwardly for rotation in a transverse plane by support bearings 14. Thus, the rotary structure is rotatable on the wheel bearings about its longitudinal axis 15 (indicated in FIG. 3). The support bearings find their support on transversely extending I-beam sections 26.

The power plant assembly of the rotary dump, indicated in FIGS. 2 and 3 at 16 is located on the left side of the rotary structure. It is rigidly supported by the front and rear actuator support tables 17 and 18, respectively. Each table comprises a horizontally disposed rectangular support plate 19 supported on either side by longitudinally extending I-beams 20, which are in turn supported at their ends by vertically extending I-beams 21. Transverse stability for the tables is provided by transversely and downwardly, inwardly extending I-beam braces 22, a pair of such braces being provided for each table, one at either end thereof, and having their outer ends rigidly connecting the upper ends of the vertically extending beams 21, and their inner ends rigidly connected inwardly of the tables and adjacent the rotary structure upon the upper surface of an I-beam 23 which extends longitudinally from end to end of the rotary dump and is itself supported at either of its ends by a pair of longitudinally spaced transversely extending I-beams 24 which comprise the end frame pieces of the support base for the entire rotary dump structure. The lower ends of the vertically extending table support beams 21 are rigidly connected in the same manner as the lower ends of the diagonal table brace members 22 to longitudinally extending I-beams 25, the ends of which are supported by the end frame beams 24.

Besides the longitudinally extending and transversely spaced beams 23 and 25, and their transverse base support end beams 24, the base support frame of the rotary dump also provides the longitudinally extending I-beam base frame member 30 on the right side of the rotary dump. The ends of this beam connect the right side ends of the inner transverse base frame beams 24. And finally, small longitudinally extending I-beam sections 31 at either end of the right side of the dump base frame rigidly connect the ends of the outer and inner transverve beams 24.

The railway car retainer body 11 comprises a base frame including four longitudinally extending and transversely spaced channels 35. The ends of these channels are supported within the rings by transversely disposed I-beams 36, one at either end of the rotary structure, and which have their end edges curved for rigid attachment to the inner surface of revolution of the rings. These transverse beams lie, when the rotary structure is at rest, in a horizontal plane below the longitudinal axis 15 of the rotary structure. The base frame of the car retainer also includes a series of longitudinally spaced and transversely disposed outside floor supports 39 which are I-beams extending between the rigidly secured at their ends to the outer and inner longitudinally extending channels 35. Longitudinally spaced and transversely extending inside I-beam floor supports 40 are rigidly connected at their ends to the two inner longitudinally extending channels 35.

The side walls of the car retainer body extend from end to end thereof, finding their support at the transverse ends of the body base frame. They comprise longitudinally extending plate panels 41 extending in opposing vertical planes from end to end of the body base frame. The plates are reinforced at their outer surface by vertically disposed and longitudinally spaced channels 42 and by a series of diagonal braces 43 which are rigidly connected at their ends to the upper and lower ends respectively of the vertical channels 42. The lower ends of the channels 42 and the braces 43 are rigidly connected to the upper surface of the tranverse ends of the body base frame structure. The end vertical channels 42A (FIG. 3) of the side walls extend upwardly above the top of the walls 11A and have their upper edges shaped for rigid attachment along the inner surface of revolution of the ring.

The opposing inner surfaces of the wall plate panels 41 provide car side guides 50 intermediate the upper and lower edges of the walls. These guides, shown only in FIG. 3 extend longitudinally of the retainer body and transversely inwardly thereof to provide guide surfaces for the sides of a railway dump car 38, shown in phantom only in FIG. 3.

The car tracks 52 run a parallel path centrally of the retainer body and find their immediate support upon the floor plate 53 thereof which is in turn supported by the upper surfaces of the base frame members 35 and 39. The side edges of the floor plate are connected along the lower edges of the wall panels.

Car retainer Z-members 54 extend longitudinally of the retainer body and inwardly in a common plane and are secured along the opposing inner surfaces of the retainer walls adjacent the upper edges thereof. In operation the lower surfaces of these Z-members support the upper chords or edges of the dump car when the car is inverted. The Z-members are reinforced for this purpose by gussets 55 longitudinally spaced along the upper surfaces of the Z-members to which they are connected. Their outer connection is to the opposing inner surfaces of the wall plates.

The end rings 12 of the rotary structure are each circumferentially reinforced by a top end plate 60 and a bottom end plate 61. The lower edges of the top plate are secured on either side of the ring to the upper surface of the transverse I-beam 36 at the ends thereof and are discontinued inwardly to connect along the ends of the body base frame and to form an arch shaped entrance for loaded dumping cars. The bottom end plate is connected along its upper edge to the lower surface of the transverse beam 36. Both plates are circularly shaped at their outer edges for rigid connection to the inner surface of revolution of the ring. Longitudinal stability between the end plates and rings is provided by circumferentially spaced forward and rearward gussets 62 connecting the forward and rearward surfaces of the plates, respectively and the inner surface of revolution of the ring.

In the rotary dump shown, and with reference to FIG. 3, the rotation of the rings and car retainer body during dumping is in the clockwise direction. Therefore, the material to be dumped will begin to escape out of the open-topped dump car before the completed dump position is reached. That is, 180 degrees from the position shown. A shield plate 70 is provided along the right side of the dump to catch escaping material and to direct it downwardly. The shield extends upwardly to a horizontal plane substantially in common with the upper edge 11A of the car retainer walls. The shield extends downwardly from this point and is curved inwardly beneath the path of the rotary structure. It is supported at its upper outer surface by its attachment to vertically extending and longitudinally spaced angle members 71. The angle members find their support at their lower ends upon the upper surface of the longitudinal base frame member 30.

At either end of the rotary structure and adjacent either side thereof there is provided a vertically oriented stop spring 73 mounted centrally upon a longitudinally extending spring plate 74 which is in turn supported at its longitudinal ends by a pair of vertically extending and longitudinally spaced support legs 75, one adjacent the front of and one adjacent the rear of each wheel bearing 13. The support legs are secured at their lower ends to the transverse support bearing mountings 26. A spring plunger 76 is secured to the top of the spring and provides a shaft extending downwardly through an aperture, not shown, in the spring plate 74, and upwardly in a direction substantially tangential to the outer circumference of the ring to a point slightly below the horizontal center line of the ring. Each ring provides a stop lug 78 secured to its outer surface at the horizontal center line of the ring and, when in the normal position, directly overlying and in contact with the upper end of the spring plunger 76 on the left side of the rotating structure. This stop spring and lug arrangement provides a cushioning for the rotary structure at the end of the 180 degree rotation for dumping and at the end of the 180 degree return rotation.

The rotary structure is locked against rotational movement between dumping operations by a lock bar 80, positioned to overlie the stop lug 78 when the ring is in the normal position. The forward end of the lock bar is secured intermediate the ends of a vertically extending lock handle 81. The attachment of the bar to the handle is such that pivotal movement of the bar is permitted in the direction away from the ring and back to its longitudinal disposition. The lower end of the lock handle is pivotally received in the operator platform 90 at the forward end thereof and is secured against rotational movement when the bar is in the lock position. A spring 91 is provided along the mid-portion of the lock handle and it connects the mid-portion at its lower end and the lock bar at its upper end. When the lever is turned to effect a movement of the lock bar away from the ring it may be returned as soon as the stop lug moves upwardly past the normal longitudinal plane of the bar. The downwardly and inwardly inclined surface of the stop cam 92 adjacent to and slightly lower than the stop lug on the ring will move the lock bar out of the downward path of the stop lug at the end of the return rotation of the dump. When the ring movement places the lock bar at the upwardly and inwardly inclined surface of the stop cam 92, the spring action between the handle intermediate portion and the bar will return the bar to its position overlying the stop lug.

The operator platform 90 is vertically spaced above the corner of the base frame of the rotary dump at the forward end thereof and is supported thereon by vertical I-beams 95 which are secured at their lower ends to the longitudinal base frame members 23 and 25. Tie angles 94 connect the inner vertical legs 95 of the platform to the adjacent support legs 75 of the forward spring plate. The platform provides the operator with access to the lock handle 81 and to the manual controls for the hydraulic system. The manual controls, about which more will be said, are positioned on the manual control valve table 96 and comprise the manual control valve 97, the emergency stop valve 98 and the start valve 99.

The power plant assembly of the rotary dump, supported on the tables 17 and 18 respectively, comprises a front rotary actuator 100 and a rear rotary actuator 101. These actuators are longitudinally spaced from one another and are secured on the actuator tables adjacent the opposing inner ends thereof. Each actuator is capable of obtaining its power from hydraulic or pneumatic pressure and consists of a cylindrical chamber 102 (FIG. 9) within which a stationary barrier 103 extends radially from a central shaft 104 against which it bears to the inner surface of revolution of the cylinder to which it is secured. The central shaft carries a radially extending vane 105. The vane and shaft are rotatable about the central axis of the shaft when fluid pressure is exerted against either side of the vane. The actuators are arranged so that the rotation of the vane and the longitudinally extending shaft is in a transverse plane relative to the rotary dump. The central shaft of each actuator extends forwardly and rearwardly of the actuator to form fore and aft stub shafts 106. The opposing stub shafts of the actuators are connected for synchronization at their ends to a longitudinally extending central tie shaft 107 by chain couplers 108, 108₁.

The rear actuator shaft, coupling, bearing, and torque arm elements of the power plant, and their connections are the same as the forward assembly except that they extend forwardly. Therefore, the same indicating numbers have been assigned to these parts. The same is true of the torque arm and connecting arm elements and their connections to the power plant and to the rotary structure. Only the front assembly will be described.

The forward stub shaft of the front actuator is connected to the forward actuator shaft 109 by a flexible coupling 110. The forward actuator shaft is supported intermediate its ends by shaft bearings 111. The end of the forward actuator shaft extends forwardly to rigidly mount the actuator end of a torque arm 112. The torque arm extends downwardly, in FIG. 3, to its connecting arm end which pivotally mounts the outer end of the connecting arm 113 by a suitable shaft and shaft bearing assembly 114. The connecting arm extends transversely of the dump to its bracket and pin connection 115 to a transversely extending inverted channel 120 which is in turn secured at its ends to the inner longitudinally extending channels 35 of the car retainer base frame. The pin and bracket connection of the connecting arm is positioned at the vertical central line of the rotary structure intermediate the longitudinal axis thereof and the circumference of the ring. That is, below the center of gravity of the rotating structure which is below the center axis of the structure when the retainer is empty or retaining an empty car after dump. When a loaded car is in the retainer the center of gravity will shift to a point above the axis.

The central tie shaft 107 is utilized to rigidly mount two longitudinally spaced and transversely disposed cam wheels. The forward cam wheel or deceleration cam wheel 125 is generally circular but is formed with a cam surface 126 extending outwardly for approximately 180 degrees along the outer surface of revolution of the wheel. Resultingly the wheel is mounted eccentrically and when it revolves 180 degrees in a clockwise direction the cam surface will actuate the clockwise deceleration valve 127 of the hydraulic circuit (FIG. 9) by depressing the roller bearing switch 128 thereof. When the tie shaft returns 180 degrees in the counter-clockwise direction the cam surface 126 will return to the normal or start position to depress the roller bearing 129 of the counter-clockwise deceleration valve 130. Each roller bearing and its valve component is spring controlled, as indicated in FIG. 9, to keep the valves open in their normal position as will become clear when the hydraulic circuit is described. The deceleration valves are mounted on either side of the deceleration cam wheel at the ends of a diagonally disposed member 131. This member is secured adjacent the opposite corners of a rectangular frame 132 which is in turn secured to deceleration valve support plate 133. The plate is supported by suitable means which connect it and the vertical members 21 and the horizontal members 20 of the actuator table 17.

The tie shaft 107 also rigidly secures the rear cam or reversing cam wheel 135. This wheel is carried by the shaft through its longitudinally extending axis so that rotation of the shaft will effect rotation of the wheel in a transverse plane. In FIG. 6 it is seen that the upper and lower edges of the wheel provide reversing cams 136 and 137 respectively. When the reversing cam wheel is turned in the clockwise direction, cam 137 will travel to strike the obstructing leg 137₁ of the valve switch 138 of the reversing valve 139 to cause the pressure flow in the hydraulic circuit to effect a counter-clockwise rotation of the shaft and cam wheels. As the reversing cam wheel approaches its initial position the clockwise cam 136 strikes the obstructing leg 136₁ of the valve switch of the reversing valve.

The reversing valve 139 is mounted adjacent the upper edge of the reversing cam wheel by a plate member 143 which is secured at its lower edge to the reversing valve support plate 144 and is reinforced by braces 146 connecting the plate member and plate on either side of the actuator shaft. The plate member is discontinued at its center (not shown) to provide a space for the tie shaft within which it may operate unobstructedly. The support plate is secured to the undersurface of the rear actuator support table 18 and extends forwardly therefrom. This support plate also provides a mounting for the pilot valve 145, the operation of which affects the direction of pressure within the fluid circuit.

The deceleration cam wheel 125 also provides the stop lobe 140 which is disposed, as seen in FIGS. 5 and 8, at the lower edge of the cam wheel when in the normal or start (and stop) position. The lobe presents an arcuate convex surface against which the roller switch 141 of the stop valve 142 is depressed in the inactive condition of the hydraulic system. The stop valve is mounted on the deceleration valve support plate adjacent the lower edge of the deceleration cam wheel.

The operation of the hydraulic system will now be described with reference to FIG. 9 in which the hydraulic circuit is shown as are the components of the circuit including the valves, actuators and cam surfaces to which reference has already been made. The indicating numerals for the already mentioned components have been repeated in the circuit diagram for clarity. For the purpose of presenting a clear layout, the stop lobe 140 which is provided by the deceleration cam wheel, as seen in FIG. 5, is shown in the FIG. 9 flow diagram as a cam surface on the reversing cam wheel. It should be understood that the circuitry can be changed by those skilled in the art to bring about the same or a similar operation and that a pneumatic system could be employed as well as the hydraulic system shown.

In the condition of the circuit just prior to start, a source of fluid under pressure is provided by a variable displacement pump PV. It receives fluid from a sump S and discharges the fluid pressure into the main conduit 200 through the four port, two position and manually operated emergency stop valve 98 which is shown in its normally open position. As shown in FIG. 3 the valve is lever operated and by actuating the mechanical position switch element 201 the cross flow paths of the valve connect the ports and fluid pressure is directed back to sump and the main conduit is also directed to sump. When the stop valve is in the normal position, as shown, with the switch element 202 having being actuated, the straight through ports of the valve connect the main conduit 200 and the fluid pressure is supplied to the stop valve 142 and to the start valve 99. Both of these valves are two positioned, four port valves and as indicated by the spring symbol R, both are spring controlled. The start valve is shown in its normally closed position before the rotary action of the dump is started while the stop lobe 140, shown on the deceleration cam wheel 135, has depressed the roller operated switch 141 to place the crossed paths of the valve in the operative position to cut off the main conduit pressure at plug y. Similarly the start valve 99 directs fluid from the main conduit via the start valve connecting conduit 205 to its cut off plug z.

The two position, four port and mechanically operated reversing valve 139 is shown as actuated by the reversing cam surface 136 and is in its clockwise open position with the through flow paths communicating with the start-reversing conduit 206 and the sump-reversing conduit 207.

The pilot valve 145 is shown in its normally closed position prior to start. It is a spring centered, three positioned, four port valve and is actuated from its center position by hydraulic switch means C and CC. When centered prior to start it provides pressure relief for the main conduit 200 via a gate valve circuit 208 which connects the main conduit through the pilot valve to a gate valve 209 back to sump. Besides being utilized to build up line pressure for proper operation of the hydraulic pilots C and CC, adjustments of the gate valve 209, not shown in the prior figures, will also affect the operating speed of the rotary dump as will be made clear.

The deceleration valves 127 and 130 are shown in their start positions with the clockwise deceleration valve 127 normally opened by operation of the valve's spring control. The counter-clockwise deceleration valve 130 is in the closed position because of the bearing contact by the cam surface 126 upon the roller operated valve switch 129. Each deceleration valve is two positioned with two ports, is spring controlled and is provided with a drain D to sump to relieve back pressure when in the closed position and when the throttling valves T and $T_1$, shown only in FIG. 9, are alternately in the actuator return lines. Each throttle contains a variable pressure compensation element and a check valve, the latter permitting free pressure flow toward the actuator when the connected deceleration valve is in the closed position, actuated by the cam surface 126.

When either deceleration valve 130 or 127 is in the open position it connects, via its through path, the actuator-deceleration conduit system 211 or 215 respectively and the pilot-deceleration conduit 210 or 216 respectively. The throttling valves are interposed between the actuator-deceleration conduits and the pilot-deceleration conduits for operation when the deceleration valves are closed.

The dumping operation via the rotation of the actuator shafts, the cam wheels and the torque and connecting arms is as follows:

The start valve 99 is activated manually by depressing the start button 220. This brings the cross flow paths into connection with the ports and directs the fluid pressure from the start valve connecting conduit 205 to the start-reversing valve conduit 206. The pressure is directed through the reversing valve to the clockwise hydraulic switch element C via the reversing-pilot conduit 221. The switch element is thereby hydraulically activated and the through flow paths of the pilot valve are brought into connection with the ports. The pressure caused by the switching of the valve is relieved through the pilot-reversing conduit 222 through the reversing valve to sump. Pressure is thereby directed from the main conduit through the gate valve circuit 208 through the pilot valve and the pilot-deceleration conduit 210 and through the throttle valve T to the clockwise pressure ports 223 of the actuators. As the vane of the actuator rotates in a clockwise direction, so do the cam wheels and resultingly the torque arms 112. The movement of the torque arms in the direction of the arrow 225 in FIG. 3 is permitted through a 180 degree rotation to place the torque arm and connecting arm above the center of gravity of the rotary mechanism as shown in phantom in FIG. 3.

At the start of rotation, the stop lobe 140 is rotated from its position depressing the roller bearing 141 of the stop valve which then becomes spring offset, to line up the through flow paths with the valve ports. This will direct the fluid pressure in the main conduit 200 through the valve to the stop-start conduit 230. Meanwhile the operator will have released the start button 220 at the beginning of the rotation of the rotary dump. The straight through paths of the spring operated start valve will again be aligned with the ports and pressure from the main conduit 200 will be cut off at plug z, but pressure from the stop-start conduit 230 will be directed through the valve to the start-reversing valve conduit 206. From there the pressure is directed through the reversing-pilot conduit 221 to maintain the pressure upon the clockwise switch element C of the pilot valve through the 180 degree dump rotation.

As the cam wheels continue to rotate, the deceleration cam surface 126 will have rotated from its position depressing the roller bearing 129 toward the roller bearing 128 of the clockwise deceleration valve 127. The counter-clockwise deceleration valve 130 will thereby become spring offset to its open position to permit the continued pressure flow from the pilot valve to the actuators via its through flow path.

Meanwhile the pressure flow from the counter-clockwise pressure ports 231 of the actuators is directed through the clockwise return line of the circuit comprising the actuator-deceleration conduit 215 the clockwise deceleration valve 127 and throttle valve $T_1$, the pilot-deceleration conduit 216, the pilot valve 145, the gate circuit 208 and gate valve 209 to sump. When the cam surface activates the roller bearing 128 to close the clockwise deceleration valve 127, the pressure is directed around the deceleration valve through the variable pressure compensator of the throttle valve $T_1$ to cause a gradual slowing of the clockwise rotation.

At the end of the 180 degree dump rotation the reversing cam 137 activates the leg switch $137_1$ of the reversing valve 139 to align the crossed flow paths thereof with the ports. The pressure from the start-reversing conduit 206 is thereby directed to the reversing-pilot conduit 222 to hydraulically activate the counter-clockwise pilot switch CC. The counter-clockwise cross paths of the pilot valve are thereby aligned with the ports thereof and the pressure from the main conduit is directed into the clockwise return line, previously described, to direct the actuator vane 105 in the counter-clockwise direction. The counter-clockwise return line will then include the counter-clockwise deceleration valve 130 and throttling valve T to effect a deceleration of the 180 degree return rotation of the actuator shaft and rotary structure when the cam surface 126 closes the deceleration valve 130. Pressure relief of the counter-clockwise return is again through the pilot valve to the gate valve and sump.

At the end of the return rotation, the stop lobe 140 again depresses roller bearing switch 141 of the stop valve to disconnect the main conduit pressure from the circuit, permitting the pilot valve to become spring centered in its normal position prior to start. The reversing valve is activated by cam 136 to again align the through paths of the valve with the ports and the cross paths of the stop valve align the start-stop conduit to sump to relieve the pressure created by the spring centering of the pilot valve. To start another dump and return cycle, the start button 220 is again depressed.

The reversing, stop and start controls may be cut off and the rotary motion of the dump run through by use of the manual control valve 97 in conjunction with only the deceleration valves and throttle valves. The ports $m_1$ and $m_2$ of the manual control valve are connected by conduits with the manual control connections $M_1$ and $M_2$ of the pilot-deceleration conduits 210 and 216 respectively. The manual control valve is spring centered and lever operated, as shown in FIG. 3 and in operation the pressure may be directed through either side of the circuit. Its four ports include a return port to sump.

It is now seen that the rotary dump of the invention is positively controlled by the continuous exerting force of the fluid power plant throughout its dumping and return cycle. The power system of the dump is such that rotation through the 180 degree dump and through the 180 degree return is accomplished by forces which are purely rotary, thereby eliminating the possibility and hazard of the dump "hanging" at a dead position intermediate its start and dump positions. The fluid power circuit provided permits smooth and perfectly controlled start, deceleration and stop procedures with only the start-requiring a manual operation. The power plant is self-sufficient in that all the signal means for varying the dump and return operations are directly affected, not by the rotary structure, but by the rotary elements of the plant.

In other words it will be seen that all an operator has to do is unlock latch 80, strike start valve 99 thereby momentarily placing it in a position connecting pressure to the pilot operator C. Pilot C will shift valve 145 to the left connecting pressure to ports 223 and venting ports 231 of the rotary actuators. Slight movement of the dump will have shifted wheel 135 so that valve 142 moves to the right thereby establishing a direct circuit from source of pressure through 99 to pilot C maintaining the position of the parts. Movement of the dump will gradually permit valve 130 to be shifted to the right while valve 127 is gradually forced to the right by the cam surface 126. In other words both the pressure input and the exhaust from the actuators will be controlled both through gate valve 209 and through the throttling connections T or $T_1$. In case an emergency rises and a stop is necessary a shift of the emergency stop valve 98 will dump both the pressure and the control lines to the sump thus permitting immediate return of valve 145 to the position shown in FIG. 9 since C or CC would be vented to sump. Shift of 145 to the position shown in FIG. 9 blocks all ports of the actuator motors and they are locked thus holding the dump.

Those skilled in the art will be able to utilize the present invention in various ways and it is not meant to limit the scope and spirit of the invention to the specific embodiment described and shown. The spirit and scope of the invention is limited only by the following claims.

What is claimed is:

1. A rotary dump comprising a longitudinally disposed car retainer mounted for rotation about its longitudinal axis between load receiving and load discharging positions, a shaft extending longitudinally of the retainer parallel to the longitudinal axis thereof and transversely spaced therefrom and mounted for rotation about its longitudinal axis, arm means extending radially from one end of said shaft and rigidly connected thereto, connecting means extending transversely of and between said car retainer and said arm means and pivotally connected to the arm means and to the car retainer along the vertical planes through the longitudinal axes thereof and offset from said longitudinal axes, rotary fluid power means connected to said shaft and driving the same whereby said arm means, connecting means and power means positively control rotation of said car retainer, said rotary fluid power means including a fluid pressure operated rotary actuator, a fluid pressure circuit operatively connected to said rotary actuator, and fluid pressure control means in said fluid circuit, at least one of said fluid pressure control means being operable wholly independent of the car retainer rotary movements.

2. The rotary dump of claim 1 wherein control means are rigidly mounted on said longitudinally extending shaft and said rotary fluid power means includes, a fluid pressure circuit variable valve means for varying and reversing the pressure in said circuit, said variable valve means being mounted adjacent said control means and being operated thereby, whereby the pressure in said fluid pressure circuit may be automatically varied and reversed in response to the position of said control means.

3. In a rotary dump having a longitudinally extending car retainer, said car retainer being mounted for rotation about its center axis between load receiving and load discharging positions, and a connecting arm pivotally connected at one of its ends to said car retainer at a point offset with respect to said center axis, said connecting arm extending transversely of said car retainer; a fluid power plant for rotating said car retainer, said fluid power plant comprising a torque arm, means pivotally connecting the other end of said connecting arm to one end of said torque arm, a longitudinally extending shaft, means connecting one end of said shaft to the other end of said torque arm to drive the same, means mounting said shaft for rotation about its longitudinal axis, a fluid power rotary actuator connected to said shaft for driving the same, cam means mounted on said shaft and including a first cam, a second cam circumferentially spaced from said first cam, a stop cam, and a deceleration cam, valve means mounted in the path of movement of said cam means and providing a plurality of selectable flow paths, a source of fluid pressure, and a fluid pressure circuit connecting said rotary actuator, said valve means, and said source to establish said selectable flow paths, said valve means being arranged to control pressure flow in said fluid pressure circuit to said rotary actuator to rotate said longitudinally extending shaft and said cam means, whereby said cam means operate said valve means to vary the flow paths thereof.

4. In the rotary dump of claim 3, wherein said valve means include reversing valve means mounted adjacent said first cam and said second cam is spaced circumferentially 180 degrees from said first cam, whereby said selectable flow paths of said reversing valve means are changed at the end of each 180 degrees of rotation of said shaft to thereby reverse the flow of pressure in said fluid pressure circuit and the direction of rotation of said shaft.

5. In the rotary dump of claim 3, wherein said valve means includes first and second deceleration valve means mounted adjacent said deceleration cam and spaced circumferentially 180 degrees from one another, each said deceleration valve means provides by its flow paths a closed position and an open position, said deceleration cam comprises a circumferentially curved radially protruding eccentric portion of said cam means, said fluid pressure circuit and said valve means are arranged to place each said deceleration valve means alternately in the return flow of pressure in said fluid pressure circuit when said deceleration cam alternately operatively contacts each said deceleration valve means to thereby change the flow paths thereof to provide a closed position of the alternately contacted deceleration valve means, and pressure throttling means are associated in said fluid pressure circuit with each said deceleration valve means to resist the return flow of pressure in said circuit to thereby decelerate the rotation of said shaft.

6. A rotary dump comprising a longitudinally disposed car retainer, means mounting said car retainer for rotation about a longitudinal axis, a longitudinally extending shaft, means mounting said shaft for rotation about a longitudinal axis substantially parallel to the longitudinal axis of said car retainer, said shaft being transversely spaced from said car retainer, a torque arm secured at one of its ends to said shaft and extending radially therefrom, transversely and horizontally extending rigid means, a first pivotal connecting means on said car retainer in the vertical plane through the longitudinal axis thereof, a second pivotal connecting means on the other end of said torque arm in the vertical plane through the axis of said shaft, said transversely and horizontally extending rigid means being interposed between and connecting said first and second pivotal connecting means, and power means operatively connected to said shaft for rotating the same whereby said car retainer rotation is positively controlled by said torque arm and rigid means.

7. The rotary dump of claim 6 wherein said power means includes rotary fluid power means mounted on said shaft for driving the same through 180 degrees of rotation and return.

8. The rotary dump of claim 6 wherein said power means includes rotary fluid power means mounted on said shaft for driving the same through 180 degrees of rotation and return, a fluid pressure circuit connected to said fluid power means, valve means in said fluid pressure circuit and mounted adjacent said shaft, control means rigidly mounted on said shaft adjacent said valve means and operatively associated therewith to shift the valve means, a source of fluid pressure, and said valve means when shifted by said control means controlling the pressure and direction of fluid in said fluid pressure circuit to thereby operate said power means and rotate said shaft.

References Cited in the file of this patent

FOREIGN PATENTS

| | | |
|---|---|---|
| 661,929 | France | Mar. 12, 1929 |
| 760,157 | France | Dec. 6, 1933 |